(12) United States Patent
Guo et al.

(10) Patent No.: US 12,542,424 B2
(45) Date of Patent: Feb. 3, 2026

(54) SILICON-BASED TUNABLE FILTER, TUNABLE LASER AND OPTICAL MODULE

(71) Applicant: INNOLIGHT TECHNOLOGY (SUZHOU) LTD., Jiangsu (CN)

(72) Inventors: Defen Guo, Jiangsu (CN); Xianyao Li, Jiangsu (CN); Wenkai Tu, Jiangsu (CN); Yuzhou Sun, Jiangsu (CN); Tianhua Lin, Jiangsu (CN)

(73) Assignee: INNOLIGHT TECHNOLOGY (SUZHOU) LTD., Jiangsu (CN)

( * ) Notice: Subject to any disclaimer, the term of this patent is extended or adjusted under 35 U.S.C. 154(b) by 681 days.

(21) Appl. No.: 17/921,357

(22) PCT Filed: Jun. 2, 2021

(86) PCT No.: PCT/CN2021/097913
§ 371 (c)(1),
(2) Date: Oct. 26, 2022

(87) PCT Pub. No.: WO2021/259027
PCT Pub. Date: Dec. 30, 2021

(65) Prior Publication Data
US 2023/0268718 A1 Aug. 24, 2023

(30) Foreign Application Priority Data
Jun. 22, 2020 (CN) .......................... 202010571046.4

(51) Int. Cl.
*H01S 5/14* (2006.01)
*H01S 5/026* (2006.01)
(Continued)

(52) U.S. Cl.
CPC ............ *H01S 5/142* (2013.01); *H01S 5/0265* (2013.01); *H01S 5/1007* (2013.01); *H01S 5/1071* (2013.01); *H01S 5/50* (2013.01)

(58) Field of Classification Search
CPC ............... H01S 5/021; H01S 5/14–142; G02B 6/29353; G02B 6/29355; G02F 1/225; G02F 1/218; G02F 1/2257
See application file for complete search history.

(56) References Cited

U.S. PATENT DOCUMENTS

2011/0102804 A1  5/2011  Lipson et al.

FOREIGN PATENT DOCUMENTS

| CN | 105322438 | 2/2016 |
|---|---|---|
| CN | 106249354 | 12/2016 |

(Continued)

OTHER PUBLICATIONS

CN105322438 English translation (Year: 2016).*
(Continued)

*Primary Examiner* — Tod T Van Roy
*Assistant Examiner* — Delma R Forde
(74) *Attorney, Agent, or Firm* — JCIPRNET

(57) ABSTRACT

Provided are a silicon-based tunable filter, laser and an optical module. The tunable laser comprises a semiconductor optical amplifier and a silicon photonic integrated chip, wherein a first coupler, a phase regulator and a tunable filter are provided on the silicon photonic integrated chip; the tunable filter comprises a flat-top band-pass filter structure, a Mach-Zehnder interferometry (MZI) structure and a micro ring resonation (MRR) structure, which are cascaded; gain light emitted by the semiconductor optical amplifier is coupled to the silicon photonic integrated chip by means of the first coupler, and a narrowband filtered optical signal is output by means of the tunable filter; and the phase of the gain light is regulated by means of the phase regulator so as to output single-peak narrowband laser light with a tunable target wavelength.

18 Claims, 15 Drawing Sheets

(51) Int. Cl.
   *H01S 5/10*   (2021.01)
   *H01S 5/50*   (2006.01)

(56) References Cited

FOREIGN PATENT DOCUMENTS

| CN | 109870767 | 6/2019 |
| CN | 110289546 | 9/2019 |
| CN | 111193548 | 5/2020 |

OTHER PUBLICATIONS

CN109870767 English translation (Year: 2019).*
JP2016212265 English translation (Year: 2016).*
Daoxin et a. "Reconfigurable photonic integrated devices on silicon" Proc. of SPIE vol. 10823, pp. 108230B•1 through 108230B-10 2018 (Year: 2018).*
"International Search Report (Form PCT/ISA/210) of PCT/CN2021/097913," mailed on Aug. 16, 2021, with English translation thereof, pp. 1-5.
"Written Opinion of the International Searching Authority (Form PCT/ISA/237) of PCT/CN2021/097913," mailed on Aug. 16, 2021, pp. 1-4.

* cited by examiner

SILICON-BASED TUNABLE FILTER, TUNABLE LASER AND OPTICAL MODULE

CROSS-REFERENCE TO RELATED APPLICATION

This application is a 371 of international application of PCT application serial no. PCT/CN2021/097913, filed on Jun. 2, 2021, which claims the priority benefits of China application no. 202010571046.4, filed on Jun. 22, 2020. The entirety of each of the above-mentioned patent applications is hereby incorporated by reference herein and made a part of this specification.

TECHNICAL FIELD

The disclosure relates to the technical field of optical communication, and in particular, relates to a silicon-based tunable filter, a laser, and an optical module.

DESCRIPTION OF RELATED ART

Tunable lasers are key devices in optical communication systems and play an important role in applications such as wavelength division multiplexing, wavelength routing, and coherent optical communication. External cavity tunable lasers feature advantages such as narrow line width, good side-mode suppression ratio, and wide wavelength tuning range, and therefore, are widely used in the coherent optical communication systems.

With the development of high-speed Internet and data centers, higher requirements are placed on the integration of equipment, and new requirements are also placed on the integration, size, and power consumption of optical modules. Due to its compatibility with CMOS process, integration of optical active/passive devices, and low power consumption, silicon photonic integrated chips have become the first choice for optical modules.

As shown in FIG. 1, a common silicon-based external cavity tunable laser includes a reflective semiconductor optical amplifier (RSOA) 100' and a silicon-based external cavity chip 200'. The RSOA 100' is generally made of Group III and V materials, and is efficiently coupled to the silicon-based external cavity chip through a spot size converter. The RSOA 100' provides laser gain, and the silicon-based external cavity chip 200' provides the resonating cavity and mode selection functions required by the laser. The silicon-based external cavity chip 200' includes a spot size converter 10', a 2×2 coupler 20', a phase shifter 30', and a tunable filter composed of dual micro-ring resonators (MRR) 40'. Herein, the two micro-ring resonators 40' are arranged on two branches of a 1×2 3 dB coupler 50' to form a reflection type tunable filter, form a laser resonating cavity together with the reflection end surface of the RSOA 100', and output laser light through one branch of the 2×2 coupler 20'. A filter with a Vernier effect composed of two micro-ring resonators with different free spectral ranges (FSR) is used in this structure to select the wavelength to achieve a tunable narrow bandwidth output. In this structure, in order to ensure a sufficiently large tuning range and only one maximum value in the spontaneous emission spectrum of the RSOA, the radii of the two micro-ring resonators need to be as close as possible. However, the spectra of the two micro-ring resonators are easily affected by the manufacturing process and the surrounding environment. Further, a small change in the radius may cause a significant change in the spectrum of double micro-ring, so the regulation and stability of the laser is easily affected.

SUMMARY

Technical Problems

The spectrum of the tunable filter of the silicon-based external cavity tunable laser is easily affected by the manufacturing process and the surrounding environment, which affects the regulation and stability of the laser.

Solutions to Problems

Technical Solutions

The disclosure aims to provide a silicon-based tunable filter, a laser, and an optical module, through which high integration, low power consumption, and small sizes are ensured, and further, advantages of convenient regulation, good stability, etc. are provided.

To achieve one of the above aims, the disclosure provides a silicon-based tunable filter including a flat-top band-pass filter structure, a Mach-Zehnder interferometry structure, and a micro ring resonation structure that are formed on a silicon substrate.

The Mach-Zehnder interferometry structure has asymmetric tunable phase shift arms. The micro ring resonation structure includes a tunable ring waveguide and two straight waveguides, and the two straight waveguides are coupled to the tunable ring waveguide to act as an Input end and a Drop end of the micro ring resonation structure. The micro ring resonation structure is cascaded with the flat-top band-pass filter structure and the Mach-Zehnder interferometry structure through the Input end and/or the Drop end.

The interference effect of the Mach-Zehnder interferometry structure and the resonance effect of the micro ring resonation structure are superimposed on an optical signal, and the filtering effect of the flat-top band-pass filter structure is also act on the optical signal, which forms a tunable narrowband filtered optical signal to output.

The disclosure further provides a tunable laser including a semiconductor optical amplifier and a silicon photonic integrated chip. A first coupler, a phase regulator, and a tunable filter are provided on the silicon photonic integrated chip, and the tunable filter includes a flat-top band-pass filter structure, a Mach-Zehnder interferometry structure, and a micro ring resonation structure which are cascaded.

The Mach-Zehnder interferometry structure has asymmetric tunable phase shift arms. The micro ring resonation structure includes a tunable ring waveguide and two straight waveguides, and the two straight waveguides are coupled to the tunable ring waveguide to act as an Input end and a Drop end of the micro ring resonation structure. The micro ring resonation structure is cascaded with the flat-top band-pass filter structure and the Mach-Zehnder interferometry structure through the Input end and/or the Drop end.

Gain light emitted by the semiconductor optical amplifier is coupled to the silicon photonic integrated chip through the first coupler, and the interference effect of the Mach-Zehnder interferometry structure and the resonance effect of the micro ring resonation structure are superimposed on the gain light and the filtering effect of the flat-top band-pass filter structure is also act on the gain light, which forms a tunable target wavelength light to output.

The phase regulator is configured to regulate the phase of the gain light.

The disclosure further provides a tunable laser including a semiconductor optical amplifier and a silicon photonic integrated chip. The semiconductor optical amplifier is configured to provide laser gain, the semiconductor optical amplifier has a first end surface and a second end surface opposite to each other, the second end surface is configured to be coupled to the silicon photonic integrated chip, and the first end surface acts as a cavity surface of a laser resonating cavity. The silicon photonic integrated chip includes:

a first coupler, configured to couple the semiconductor optical amplifier and the silicon photonic integrated chip;

a phase regulator, configured to regulate the phase of the laser light; and a tunable filter, configured to filter the resonant light in the laser resonating cavity to obtain a single-peak narrowband laser output, where another cavity surface of the laser resonating cavity is disposed on the tunable filter, and the first coupler and the phase regulator are located in the laser resonating cavity.

The tunable filter includes a flat-top band-pass filter structure, a Mach-Zehnder interferometry structure, and a micro ring resonation structure which are cascaded. The Mach-Zehnder interferometry structure has asymmetric tunable phase shift arms. The micro ring resonation structure includes a tunable ring waveguide and two straight waveguides, and the two straight waveguides are coupled to the tunable ring waveguide to act as an Input end and a Drop end of the micro ring resonation structure. The micro ring resonation structure is cascaded with the flat-top band-pass filter structure and the Mach-Zehnder interferometry structure through the Input end and/or the Drop end.

The disclosure further provides an optical module including the tunable laser according to any one of the above.

Beneficial Effects of Disclosure

Beneficial Effects

Beneficial effects of the disclosure include that: the single-peak narrowband filtering is realized by combining the single micro ring resonation structure with the Mach-Zehnder interferometry structure and the band-pass filter structure that are based on silicon photonic integration technology. High integration, low power consumption, and small sizes are ensured, and further, it avoids the problems that the dual micro-ring tuning is easily affected by the manufacturing process and the surrounding environment, and advantages of convenient regulation and good stability, etc. are provided.

BRIEF DESCRIPTION OF THE DRAWINGS

Description of the Drawings

Figure 1:
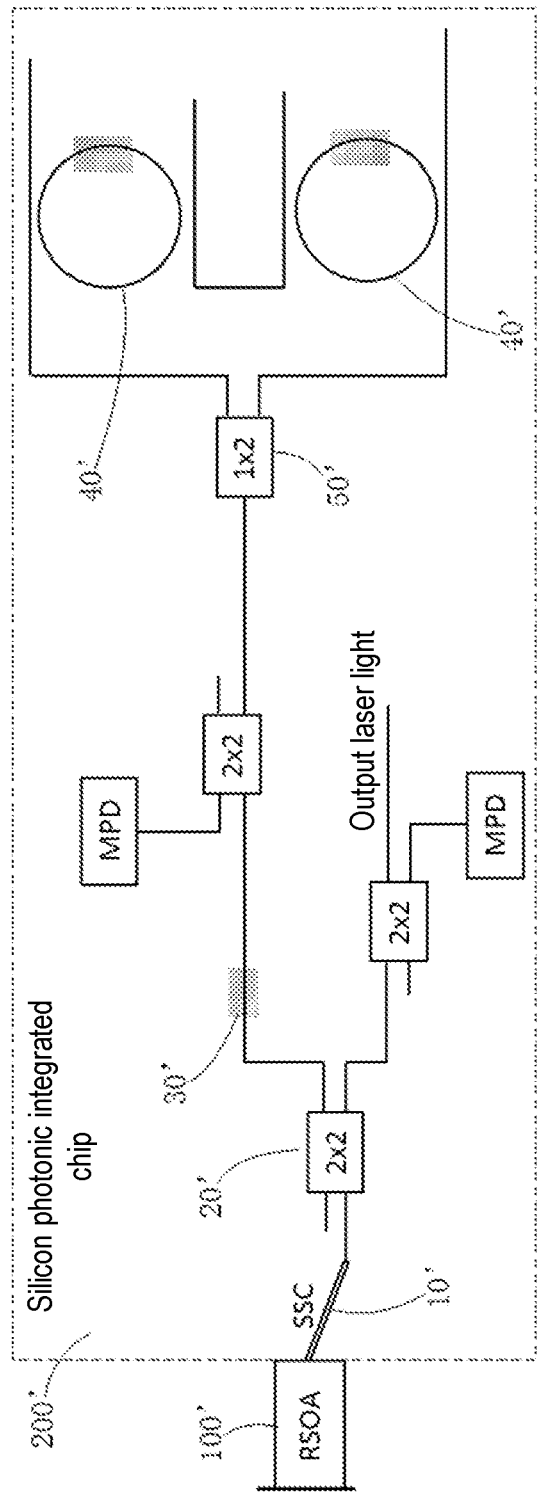

FIG. 1 is a structural schematic diagram of a tunable laser according to the related art.

Figure 2:
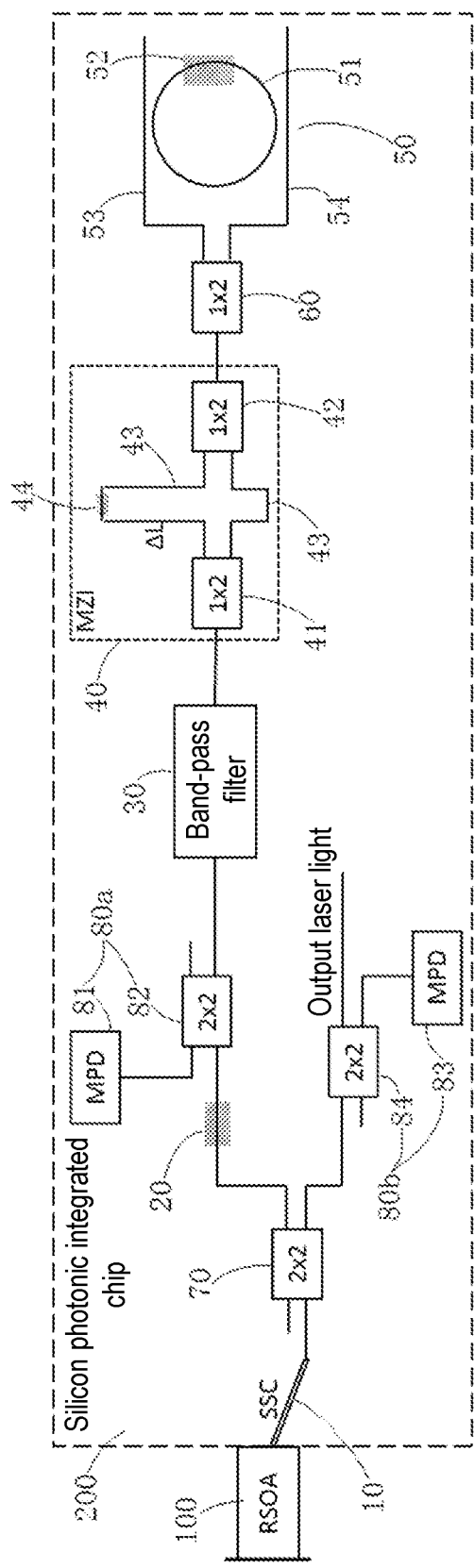

FIG. 2 is a structural schematic diagram of a tunable laser according to the disclosure.

Figure 3:
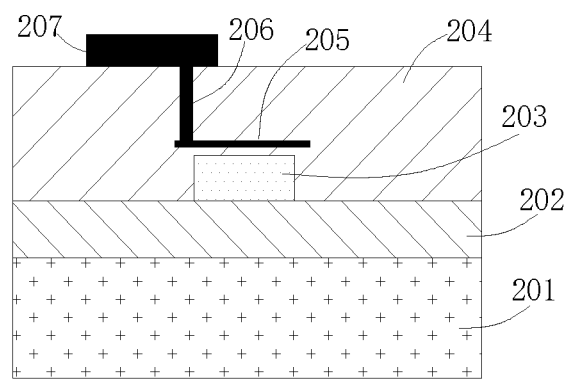

FIG. 3 is a cross-sectional schematic view of a thermally tunable phase shifter.

Figure 4:
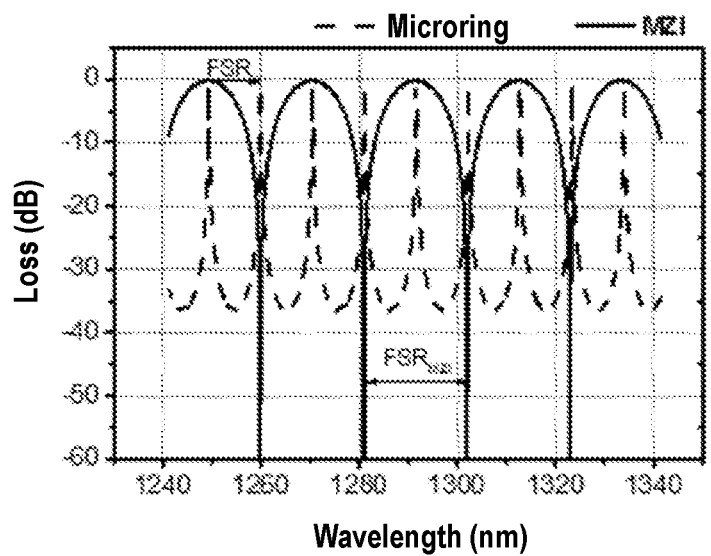

FIG. 4 is a schematic graph of filtered spectra of a micro ring and MZI according to the disclosure.

Figure 5:
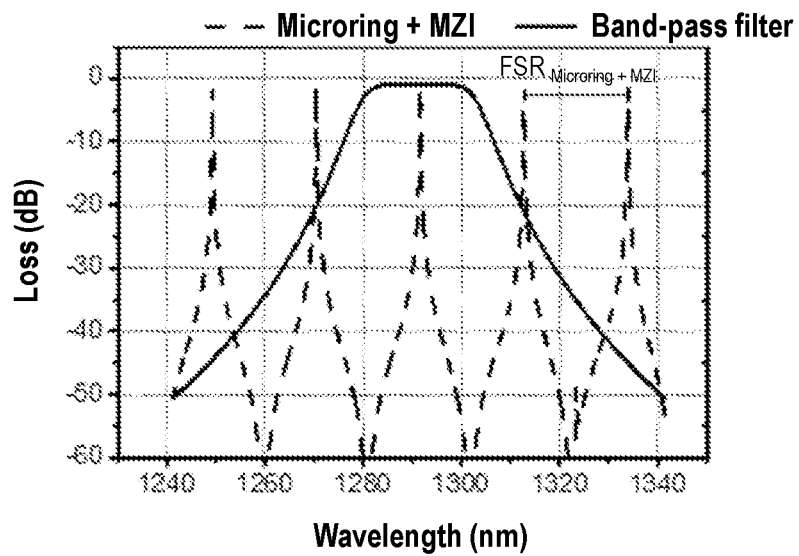

FIG. 5 is a schematic graph of superimposed filtered spectra of the micro ring and MZI in FIG. 4.

Figure 6:
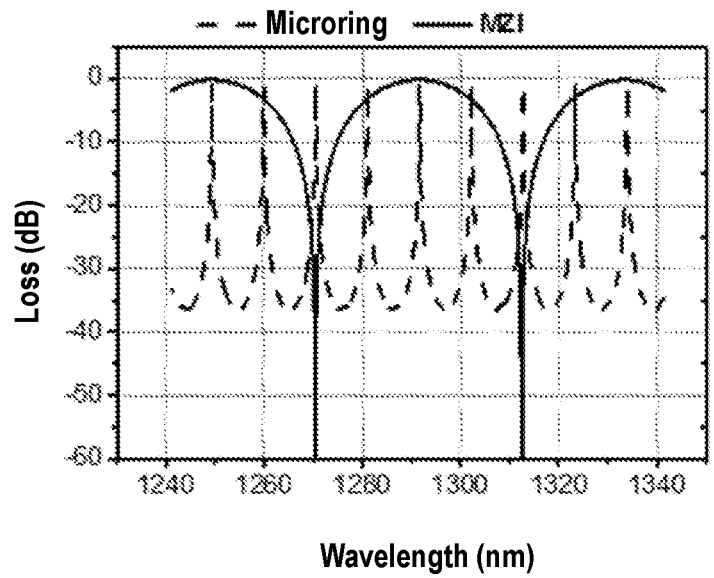

FIG. 6 is a schematic graph of filtered spectra of another micro ring and MZI according to the disclosure.

Figure 7:
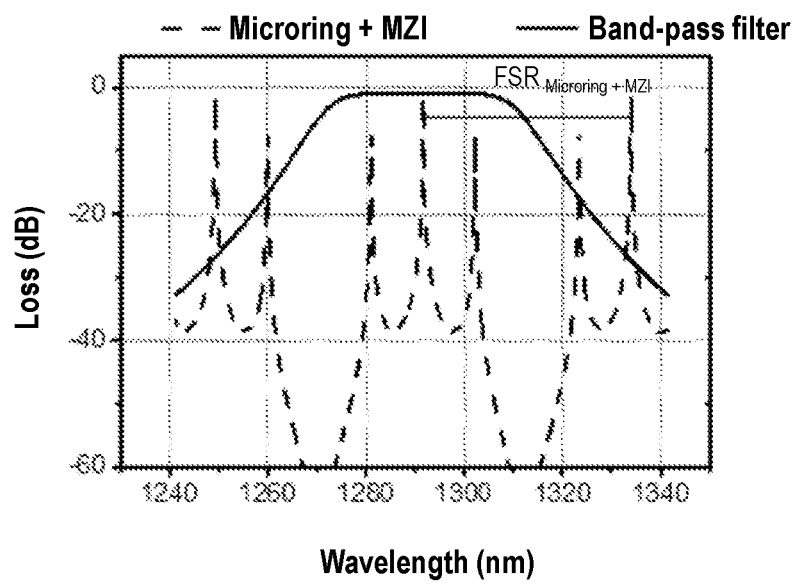

FIG. 7 is a schematic graph of superimposed filtered spectra of the micro ring and MZI in FIG. 6.

Figure 8:
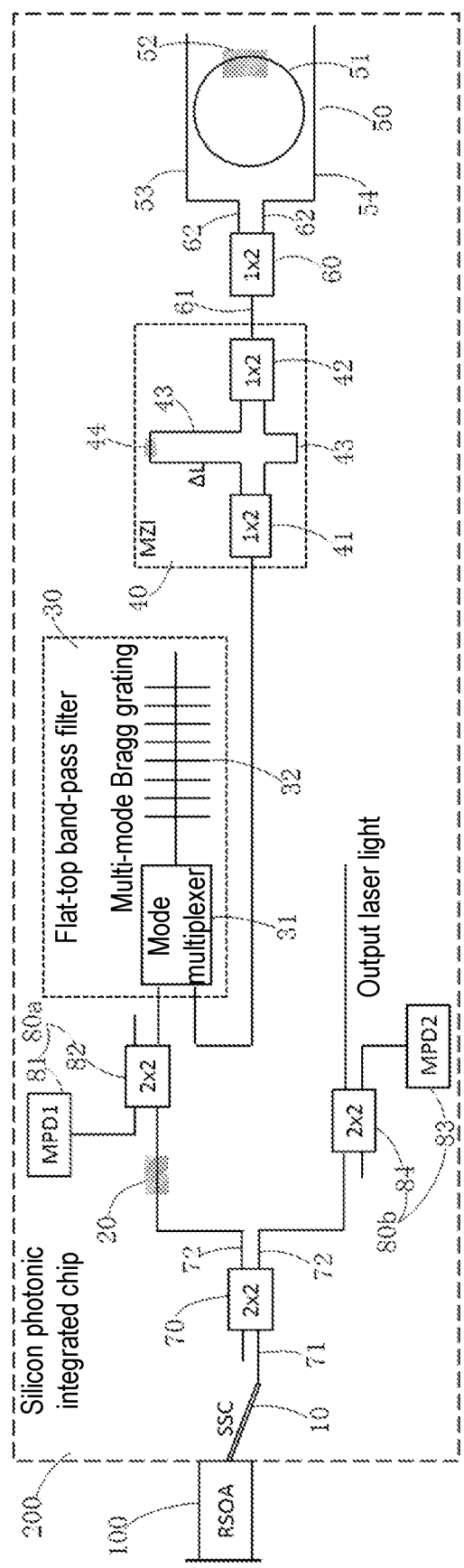

FIG. 8 is a structural schematic diagram of the tunable laser according to Embodiment 1 of the disclosure.

Figure 9:
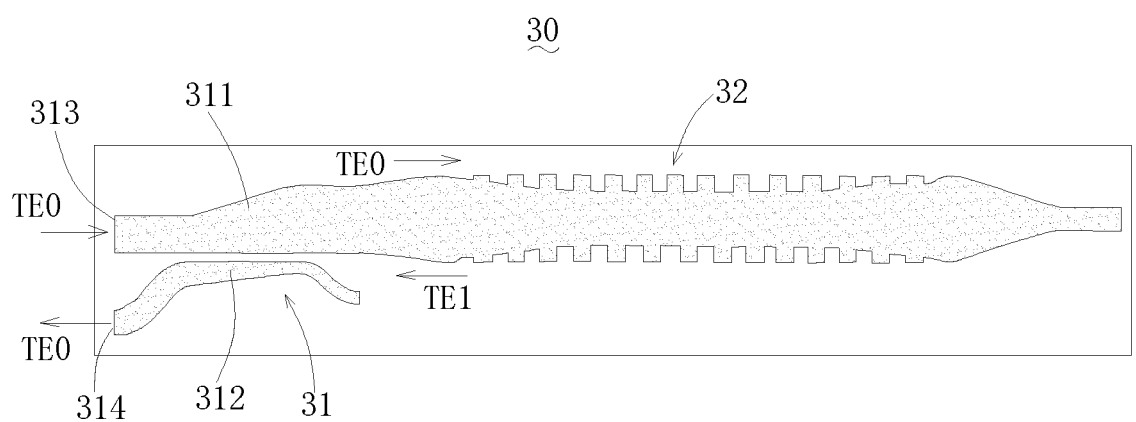

FIG. 9 is a structural schematic diagram of a flat-top band-pass filter structure according to the disclosure.

Figure 10:
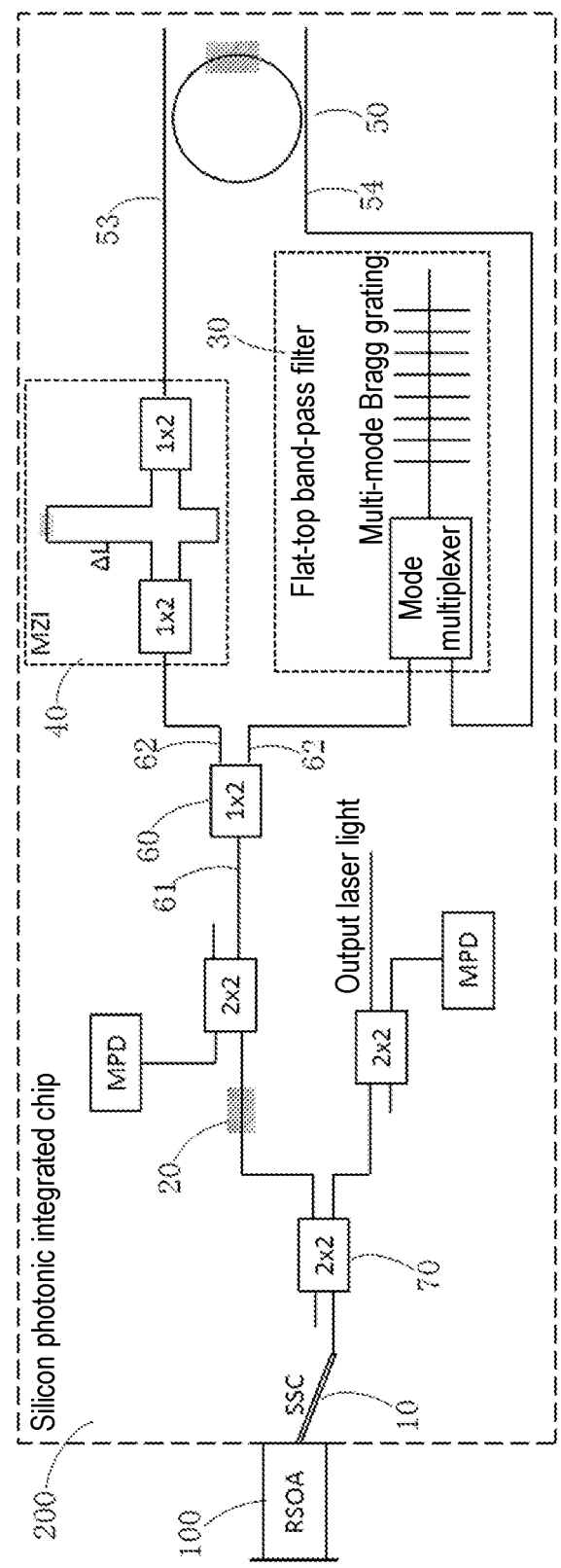

FIG. 10 is a schematic diagram of a deformed structure of a tunable filter in the tunable laser according to Embodiment 1 of the disclosure.

Figure 11:
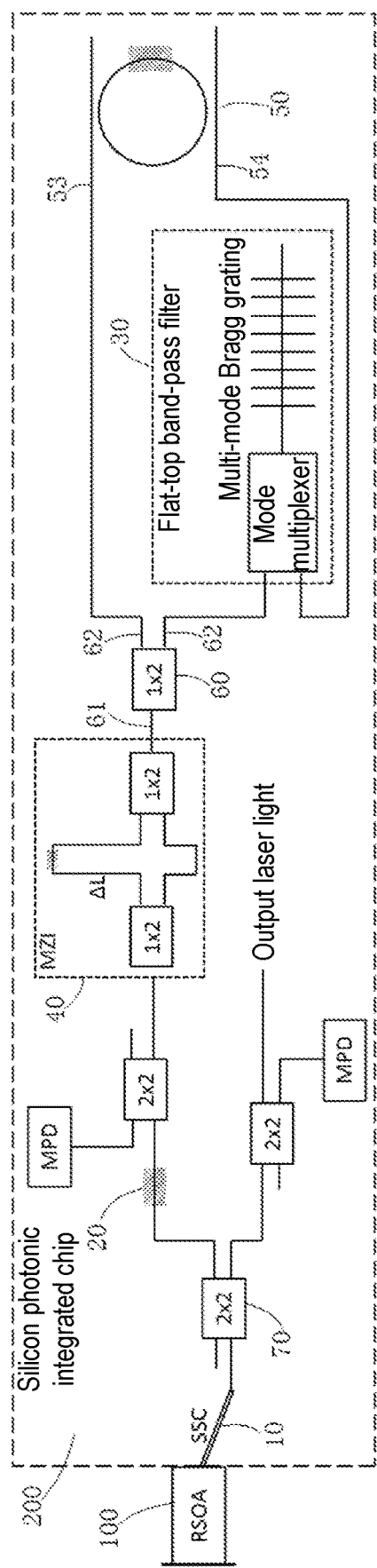

FIG. 11 is a schematic diagram of another deformed structure of the tunable filter in the tunable laser according to Embodiment 1 of the disclosure.

Figure 12:
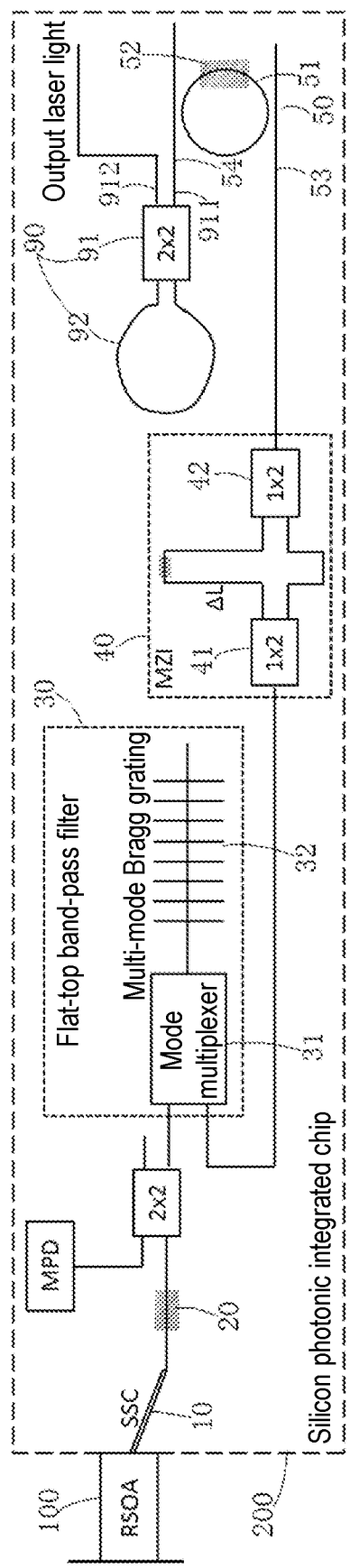

FIG. 12 is a structural schematic diagram of the tunable laser according to Embodiment 2 of the disclosure.

Figure 13:
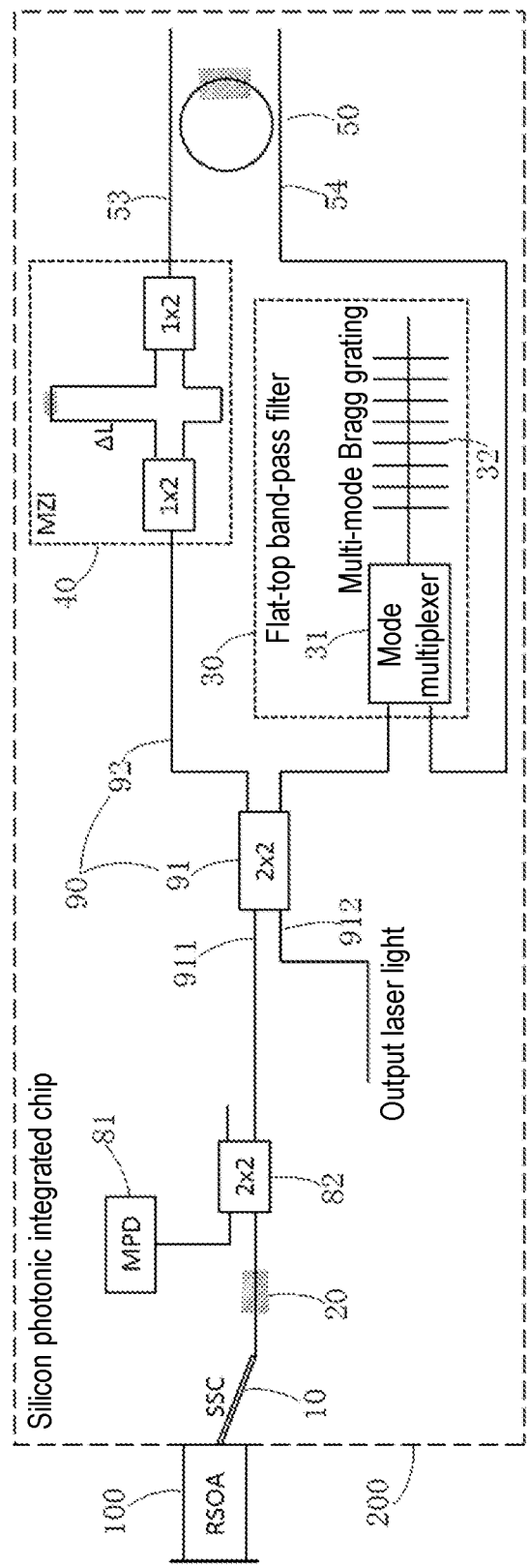

FIG. 13 is a schematic diagram of a deformed structure of the tunable filter in the tunable laser according to Embodiment 2 of the disclosure.

Figure 14:
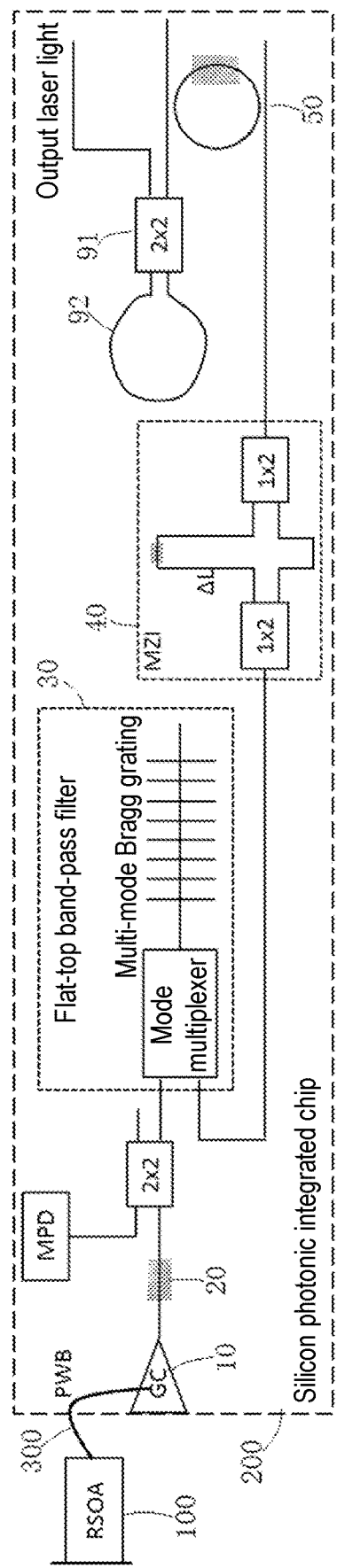

FIG. 14 is a structural schematic diagram of the tunable laser according to Embodiment 3 of the disclosure.

Figure 15:
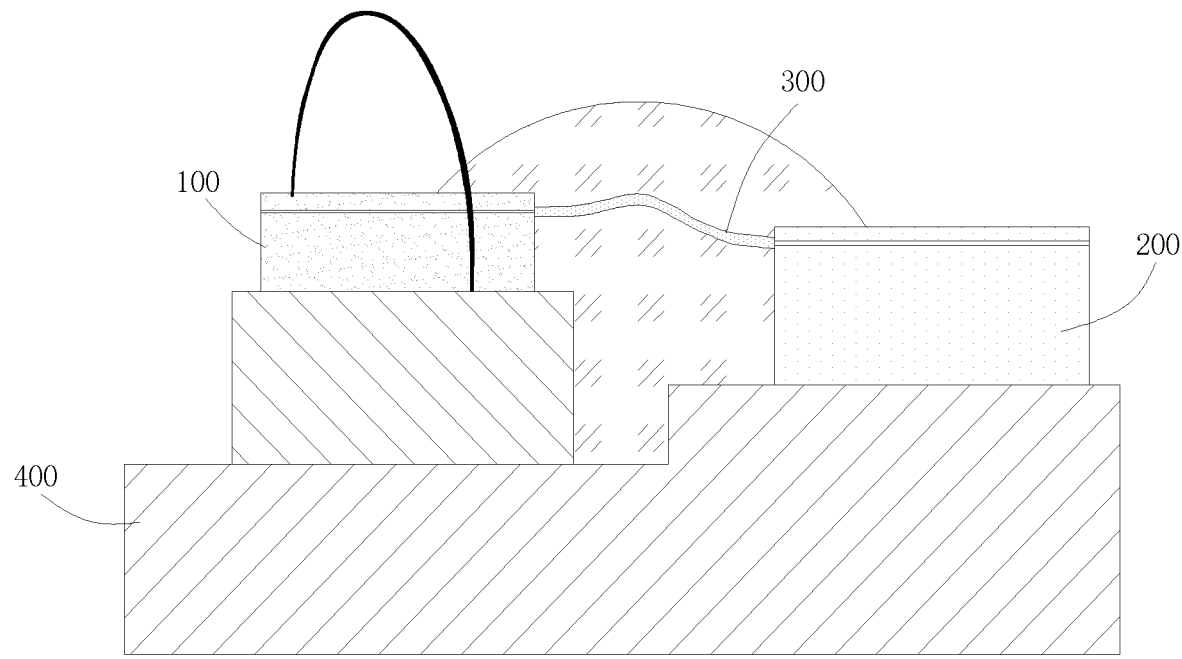

FIG. 15 is a schematic diagram of photonic wire bonding according to Embodiment 3 of the disclosure.

Figure 16:
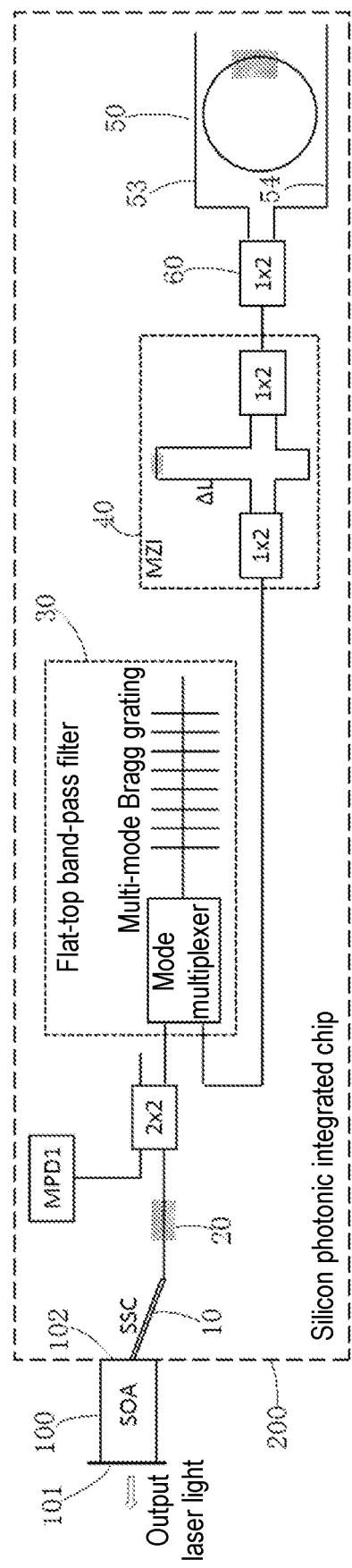

FIG. 16 is a structural schematic diagram of the tunable laser according to Embodiment 4 of the disclosure.

Figure 17:
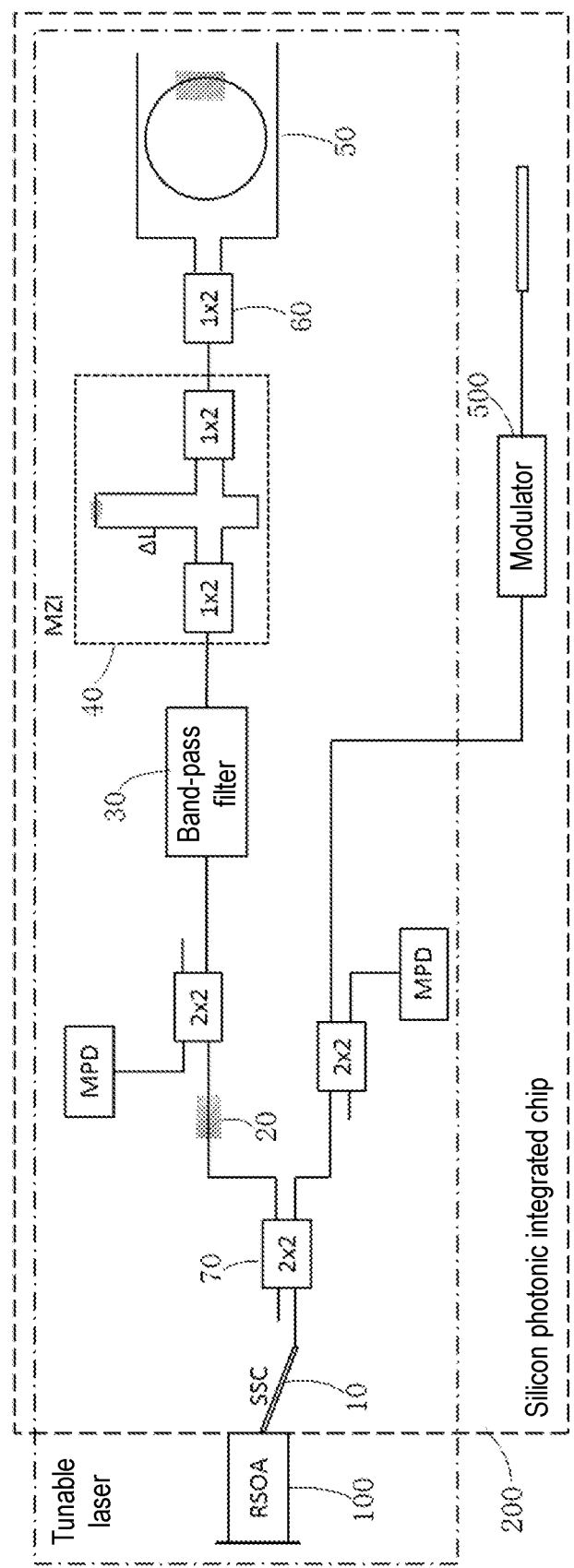

FIG. 17 is a structural schematic diagram of an optical module according to Embodiment 5 of the disclosure.

DESCRIPTION OF THE EMBODIMENTS

Embodiments of the Disclosure

The disclosure will be described in detail below with reference to the specific embodiments shown in the accompanying figures. However, these embodiments do not limit the disclosure, and the structural, method, or functional transformations made by a person having ordinary skill in the art according to these embodiments are all included in the protection scope of the disclosure.

In various figures of the disclosure, some dimensions of structures or parts are exaggerated relative to other structures or parts for convenience of illustration, and thus, are only used to illustrate the basic structure of the subject matter of the disclosure.

In addition, terms such as "up", "above", "down", "below," etc. are spatially relative terms that are used for ease of description to describe the relationship of one element or feature shown to another element or feature as shown in the accompanying figures. The terms of relative position in space may be intended to encompass different orientations of a device in use or operation other than the orientation shown in the accompanying figures. For instance, if the device in the figures is turned over, units described as "below" or "beneath" other units or features would then be oriented "above" the other units or features. Therefore, the exemplary term "below" may encompass both an orientation of above and below. The device may be otherwise oriented (rotated 90 degrees or otherwise) to interpret the spatially relative descriptors used herein accordingly. When an element or layer is referred to as being "on" and "connected" to another element or layer, it can be directly on and connected to another element or layer, or an intermediate element or a layer may be present.

The disclosure provides an external cavity tunable laser based on silicon optical integration. In the related art, in a laser external cavity based on silicon photonic integration, a tunable filter formed by a double microring resonator (MRR) structure is used for mode selection, which is easily affected by the manufacturing process and the surrounding environment, so laser regulation and stability is thereby affected. In order to solve the above problems, in the disclosure, the silicon-based tunable filter used in the tunable laser adopts only one micro ring resonation (MRR) structure, combining with a Mach-Zehnder interferometry (MZI) structure and a flat-top band-pass filter structure. High integration, low power consumption, and a small size are ensured, and further, advantages of convenient regulation, good stability, etc. are provided. To be specific, description is provided in detail in the following embodiments.

Embodiment 1

As shown in FIG. 2, a tunable laser provided by the disclosure includes a semiconductor optical amplifier (SOA) 100 and a silicon photonic integrated chip 200. Herein, the semiconductor optical amplifier 100 adopts a reflective semiconductor optical amplifier (RSOA), which is usually a gain chip made of Group III and V materials. The RSOA may achieve efficient coupling with an external cavity provided on the silicon photonic integrated chip 200 through a coupler to form an external cavity tunable laser. A first coupler 10, a phase regulator 20, and a tunable filter are provided on the silicon photonic integrated chip 200. The semiconductor optical amplifier 100 has a first end surface and a second end surface opposite to each other, and the second end surface of the semiconductor optical amplifier 100 is coupled to the silicon photonic integrated chip 200 through the first coupler 10. The phase regulator 20 is configured to regulate the phase of the output laser light. One end surface of the laser resonating cavity is located on the first end surface of the semiconductor optical amplifier 100, and the other end surface of the laser resonating cavity is located on the tunable filter. The first coupler 10 and the phase regulator 20 are located in the laser resonating cavity. In this embodiment, the first coupler 10 is a spot size converter, and the reflective semiconductor optical amplifier is directly butted to the spot size converter to be efficiently coupled to the silicon photonic integrated chip 200 through the spot size converter. The phase regulator 20 is a thermally tunable phase shifter, and the phase of the gain light in the external cavity may be regulated through the thermally tunable phase shifter. In other embodiments, the phase regulator may be a phase shifter providing other regulation methods such as current regulation or piezo-optical regulation.

The tunable filter is a silicon-based tunable filter disposed on the silicon photonic integrated chip 200 and includes a flat-top band-pass filter structure 30, a Mach-Zehnder interferometry (MZI) structure 40, and a micro ring resonation (MRR) structure 50 which are cascaded. In this embodiment, the Mach-Zehnder interferometry structure 40 includes a first 3 dB coupler 41, two asymmetric tunable phase shift arms 43, and a second 3 dB coupler 42. A first tunable phase shifter 44 is provided on one of the two asymmetric tunable phase shift arms 43. By regulating the first tunable phase shifter 44, the phase of the output spectrum of the Mach-Zehnder interferometry structure 40 may be tuned to be aligned with a specific wavelength. The micro ring resonation structure 50 includes a tunable ring waveguide 51 and two straight waveguides, and the two straight waveguides are coupled to the tunable ring waveguide 51 to act as an Input end (input end) 53 and a Drop end (download end) 54 of the micro ring resonation structure. A second tunable phase shifter 52 is provided on the tunable ring waveguide 51. The phase of the output spectrum of the micro ring resonation structure 50 may be tuned by the second tunable phase shifter 52, so that the spectrum peak after superimposed with the Mach-Zehnder interferometry structure 40 is aligned with a specific wavelength. Herein, both the first tunable phase shifter 44 and the second tunable phase shifter 52 use thermally tunable phase shifters, or phase shifters providing other regulation methods such as current regulation or piezo-optical regulation may also be used in other embodiments. FIG. 3 is a cross-sectional schematic view of a thermally tunable phase shifter, and from bottom to top are a silicon substrate 201, a buried oxide layer 202, an optical waveguide 203, and an upper cladding layer 204. A heater electrode 205 is provided near the optical waveguide 203. The heater electrode 205 is electrically connected to a metal electrode 207 above the upper cladding layer 204 through a conductive via 206, and the heater electrode 205 is powered by an external power source through the metal electrode 207. Regulating the voltage or current of the heater electrode 205 changes the optical parameters of the section of the optical waveguide 203, such as the refractive index and so on, thereby changing the phase of the optical signal in this section.

As shown in FIG. 2, the micro ring resonation structure 50 is cascaded with the flat-top band-pass filter structure 30 and the Mach-Zehnder interferometry structure 40 through the Input end 53 and/or the Drop end 54 to form the tunable filter. The interference effect of the Mach-Zehnder interferometry structure 40 and the resonance effect of the micro ring resonation structure 50 are superimposed on an incident light, and the filtering effect of the flat-top band-pass filter structure 30 is also act on the incident light, which forms a tunable narrowband filtered optical signal to output. The gain light emitted by the semiconductor optical amplifier 100 is coupled onto the silicon photonic integrated chip 200 through the first coupler 10, and the interference effect of the Mach-Zehnder interferometry structure 40 and the resonance effect of the micro ring resonation structure 50 are superimposed on superimposed on the gain light, and the filtering effect of the flat-top band-pass filter structure 30 is also act on the gain light, which forms a tunable target wavelength light to output. The phase regulator 20 is used to tune the phase of the gain light to superimpose the filter spectrum of the tunable filter to output tunable single-peak narrowband laser light.

Herein, the free spectral range (FSR1) of the interference spectrum of the Mach-Zehnder interferometry structure is different from the free spectral range (FSR2) of the filtered spectrum of the micro ring resonation structure. In this embodiment, the relationship between FSR1 and FSR2 is 2×FSR2≤FSR1≤4×FSR2, that is, the free spectral range of the Mach-Zehnder interferometry structure is greater than or equal to twice the free spectral range of the micro ring resonation structure and is less than or equal to four times the free spectral orientation of the micro ring resonation structure. The 3 dB bandwidth of the flat-top band-pass filter is greater than or equal to the tuning range of the laser and is less than the difference between twice the FRS1 and the tuning range of the laser. FIGS. 4 and 5 show the filtered spectra of MZI and MRR and the superimposed filtered spectra of MZI and MRR. Taking the center wavelength of 1290 nm and the tuning range of the laser at 1290±8 nm as an example, the FSR of MRR is designed to be 12 nm, and the FSR of MZI is 24 nm, which is twice the FSR of MRR. MZI and MRR are tuned separately, so that the peak center wavelength of the superimposed filtered spectrum of the two within the tuning range of the laser is aligned with the target wavelength, such as aligning to 1290 nm. The FSR of the filtered spectrum superimposed by the two is equal to the FSR of MZI, that is, 24 nm. The flat-top band-pass filter is then used to filter out other peaks outside the laser tuning range of 1290±8 nm, and a single-peak narrowband filtered optical signal may be obtained. Herein, the center wavelength of the flat-top band-pass filter is located at 1290 nm, and the 3 dB bandwidth is 24 nm. FIGS. 6 and 7 are also the filtered spectra of MZI and MRR, as well as the superimposed filtered spectra. Taking the center wavelength of 1,290 nm and the tuning range of the laser at 1290±8 nm as an example, the FSR of MRR is designed to be 12 nm, and the FSR of MZI is 48 nm, which is 4 times the FSR of MRR. The FSR of the spectrum after the superposition of the two is equal to the FSR of MZI, that is, 48 nm. There is a maximum peak around the wavelength of 1290 nm, and there are two secondary peaks on both sides of the maximum peak, in the superimposed filtered spectrum. The power difference between the nearby secondary peaks and the maximum peak is greater than 3 dB, so that the secondary peaks can be ignored. The flat-top band-pass filter is then used to filter out other peaks outside the laser tuning range of 1290±8 nm, and a single-peak narrowband filtered optical signal may be obtained. Herein, the center wavelength of the flat-top band-pass filter is located at 1290 nm, and the 3 dB bandwidth is 55 nm. If the FSR of the MZI is greater, such as greater than 4 times the FSR of the MRR, the power of the sub-peak near the maximum peak of the filtered spectrum superimposed by the MZI and MRR may be higher and cannot be ignored, resulting in the inability to achieve single-peak narrowband filtering.

In this structure, the Mach-Zehnder interferometry structure has asymmetrically tunable phase shift arms, making it easy to align its spectrum around a specific wavelength. By regulating the spectrum of the single micro ring resonation structure so that it is aligned with the spectrum of the Mach-Zehnder interferometry structure near the specific wavelength, the initial regulation may be completed, and such regulation is simple and fast. Further, through the combination of the Mach-Zehnder interferometry structure and the micro ring resonation structure, the free spectral range (FSR) of the overall tunable filter may be increased and the requirement for the micro ring radius of the single micro ring resonation structure is low. The micro ring radius may be appropriately increased in this way, so that the performance of the micro ring may be improved, and the stability of the tunable filter and the tunable laser is increased.

As shown in FIGS. 8 and 9, the flat-top band-pass filter structure 30 includes a mode multiplexer 31 and a multi-mode Bragg grating 32. Herein, the mode multiplexer 31 includes a straight-through waveguide 311 and a cross-couple waveguide 312. The straight-through waveguide 311 has a straight-through port 313, and the cross-couple waveguide 312 has a cross-over port 314. The straight-through waveguide 311 is connected to the multi-mode Bragg grating 32. The incident light in TE0 mode input from the straight-through port 313 is incident on the multi-mode Bragg grating 32 through the straight-through port 311. The multi-mode Bragg grating 32 filters the incident light and returns a reflected light in TE1 mode, then the reflected light undergoes mode conversion while transmitting from the straight-through waveguide 311 to the cross-couple waveguide 312, and the reflected light in TE0 mode is then output from the cross-over port 314. Similarly, the incident light in TE0 mode incident from the cross-over port 314 is incident on the multi-mode Bragg grating 32 in TE1 mode after mode conversion from the cross-couple waveguide 312 to the straight-through waveguide 311. The multi-mode Bragg grating 32 filters the incident light and returns a reflected light in TE0 mode, then the reflected light is output through the straight-through port 313 of the straight-through waveguide 311. The flat-top band-pass filter structure 30 is cascaded into the optical path of the tunable filter through the straight-through port 313 and the cross-over port 314 of the mode multiplexer 31.

In this embodiment, the tunable filter also includes a 1×2 coupler 60. The 1×2 coupler 60 includes a main waveguide 61 and two branch waveguides 62, and the two branch waveguides 62 are respectively connected to the Input end 53 and the Drop end 54 of the micro ring resonation structure 50. The micro ring resonation structure 50 forms the reflection end of the laser external cavity. The first 3 dB coupler 41 of the Mach-Zehnder interferometry structure 40 is connected to the cross-over port 314 of the mode multiplexer 31 of the flat-top band-pass filter structure 30, and the second 3 dB coupler 42 is connected to the main waveguide 61 of the 1×2 coupler 60. The straight-through port 313 of the mode multiplexer 31 is connected to the phase regulator 20 through a waveguide. Certainly, in other embodiments, the positions of the Mach-Zehnder interferometry structure and the flat-top band-pass filter structure may be interchanged. That is, the straight-through port of the mode multiplexer of the flat-top band-pass filter structure is connected to the second 3 dB coupler of the Mach-Zehnder interferometry structure, and the cross-over port is connected to the main waveguide of the 1×2 coupler. The first 3 dB coupler of the Mach-Zehnder interferometry structure is connected to the phase regulator through a waveguide.

The silicon photonic integrated chip 200 is also provided with a first optical splitting coupler 70, which is disposed on the waveguide between the first coupler 10 and the tunable filter and is configured for splitting part of the laser light in the laser external cavity to output. The first optical splitting coupler 70 includes a common port 72 and two branch ports 72. The first optical splitting coupler 70 is connected to the waveguide between the first coupler 10 and the tunable filter through the common port 71 and one branch port of the two branch ports 72, and the other branch port of the two branch ports 72 is a laser output port. The optical splitting ratio of the branch port acting as the laser output port is in the range of 10% to 90%, and considering the conditions of the threshold current and the output optical power, the optical splitting ratio of the branch port acting as the laser output port in this embodiment is 70% to 80%. In this embodiment, the common port 71 of the first optical splitting coupler 70 is connected to the first coupler 10, one branch port 72 is connected to the phase regulator 20, and the other branch port 72 acts as a laser output port for outputting laser light. Certainly, in other embodiments, the first optical splitting coupler may also be connected between the phase regulator and the tunable filter. Alternatively, the first optical splitting coupler may also be reversely connected to the waveguide between the first coupler and the tunable filter. For instance, the common port of the first optical splitting coupler is connected to the phase regulator, one branch port is connected to the first coupler, and the other branch port acts as a laser output port for outputting laser light.

In this embodiment, two monitoring structures are also provided on the silicon photonic integrated chip 200: a first monitoring structure 80a and a second monitoring structure 80b, which are respectively used to monitor the filtering spectrum of the tunable filter and the output optical power of the laser output port. Herein, the first monitoring structure 80a includes a first monitor photodiode 81 and a second optical splitting coupler 82, and the second monitoring structure 80b includes a second monitor photodiode 83 and a third optical splitting coupler 84. Each of the second optical splitting coupler 82 and the third optical splitting coupler 84 includes a common port and two branch ports, where one split port has a smaller optical splitting ratio, generally 1% to 10%, and in this embodiment, the smaller optical splitting ratio is 5%. In the second optical splitting coupler 82, the common port is connected to the tunable filter, the branch port with a larger optical splitting ratio is connected to the phase regulator 20, and the branch port with the smaller optical splitting ratio is connected to the first monitor photodiode 81 for monitoring the filtering spectrum of the tunable filter. The common port of the third optical splitting coupler 84 is connected to the laser output port, which is one branch port of the first optical splitting coupler 70. The branch port with a smaller optical splitting ratio of the third optical splitting coupler 84 is connected to the second monitor photodiode 83 for monitoring the output optical power of the laser output port, and the branch port with a larger optical splitting ratio is used to output laser light. Certainly, in other embodiments, the first monitoring structure or the second monitoring structure may be only provided, and the position and number of the monitoring structures may be set according to needs. Herein, the first optical splitting coupler 70, the second optical splitting coupler 82, and the third optical splitting coupler 84 all use 2×2 couplers, which are designed with different optical splitting ratios and have improved stability.

In other embodiments, the flat-top band-pass filter structure, the Mach-Zehnder interferometry structure, and the micro ring resonation structure in the tunable filter may also be cascaded as follows: As shown in FIG. 10, both the flat-top band-pass filter structure 30 and the Mach-Zehnder interferometry structure 40 are arranged between the two branch waveguides 62 of the 1×2 coupler and the Input end 53 and the Drop end 54 of the micro ring resonation structure 50. Alternatively, as shown in FIG. 11, the flat-top band-pass filter structure 30 is arranged between one branch waveguide 62 of the 1×2 coupler 60 and the Input end 53 or the Drop end 54 of the micro ring resonation structure 50, and the Mach-Zehnder interferometry structure 40 is connected to the main waveguide 61 of the 1×2 coupler 60. Certainly, the positions of the flat-top band-pass filter structure 30 and the Mach-Zehnder interferometry structure 40 may be interchanged.

Embodiment 2

As shown in FIG. 12, the difference between this embodiment and Embodiment 1 is that in this embodiment, a ring mirror 90 is used as a partial reflection end of the laser external cavity, and the 1×2 coupler and the first optical splitting coupler in Embodiment 1 are omitted. Herein, the ring mirror 90 includes a 2×2 coupler 91 disposed on the silicon photonic integrated chip 200 and a ring waveguide 92 connected to two ports on one side of the 2×2 coupler 91. The two ports on the other side of the 2×2 coupler 91 are an input port 911 and an output port 912, and the output port 912 is used as a laser output port for outputting laser light. That is, one end surface of the reflective semiconductor optical amplifier 100 constitutes a reflection end surface of the laser resonating cavity, and the ring mirror 90 formed by the 2×2 coupler 91 and the ring waveguide 92 constitutes a partial reflection end surface of the laser resonating cavity. Herein, the ring waveguide 92 refers to a waveguide that is connected to two ports on one side of the 2×2 coupler 91. The extension path of the waveguide may be designed according to actual needs and just need to make the ring waveguide be able to return light output from one of the two ports to the other port, not necessarily a strict ring shape, and other devices may also be designed on the waveguide. The light incident on the 2×2 coupler 91 from the input port 911 is divided into two parts, the two parts of light are respectively input into the ring waveguide 92 from the two ends of the ring waveguide 92, and travel in the ring waveguide 92 in opposite directions, and are then input to the 2×2 coupler 91 again from both ends of the ring waveguide 92. Each path of light is divided into two parts, one part is output from the output port 912, and the other part is returned to the laser resonating cavity from the input port 911.

To be specific, as shown in FIG. 12, in this embodiment, the flat-top band-pass filter structure 30 of the tunable filter is connected to the first 3 dB coupler 41 of the Mach-Zehnder interferometry structure 40, the second 3 dB coupler 42 of the Mach-Zehnder interferometry structure 40 is connected to the Input end 53 of the micro ring resonation structure 50, and the Drop end 54 of the micro ring resonation structure 50 is connected to the input port 911 of the ring mirror 90. The gain light emitted by the reflective semiconductor optical amplifier 100 is coupled onto the silicon photonic integrated chip 200 through the first coupler 10 and is then incident on the ring mirror 90 after passing through the phase regulator 20, the flat-top band-pass filter structure 30, the Mach-Zehnder interferometry structure 40, and the micro ring resonation structure 50 in sequence. Part of the gain light is output from the output port 912 of the ring mirror 90, and another part of the gain light is returned from the input port 911 of the ring mirror 90 to the external resonating cavity to resonate. Herein, the optical splitting ratio of the cross-over port of the 2×2 coupler 91 may be in the range of 2% to 20%, and the output light ratio of the corresponding output port 912 is in the range of 36% to 96%. The cascading sequence of the flat-top band-pass filter structure 30, the Mach-Zehnder interferometry structure 40, and the micro ring resonation structure 50 in the tunable filter is not limited and may be reasonably arranged according to the actual design situation.

As in Embodiment 1, a monitoring structure may also be provided in this embodiment, for example, a first monitoring structure is provided between the phase regulator and the tunable filter for monitoring the filtering spectrum of the tunable filter. The setting manner of the first monitoring structure is the same as that of Embodiment 1, and details are not repeated here. A second monitoring structure may also be provided at the laser output port to monitor the output optical power of the laser output port.

In this structure, a ring mirror is used as the partial reflection end of the external resonating cavity, the 1×2 coupler and the first optical splitting coupler in Embodiment 1 are omitted. In this way, the number of couplers is reduced, so that a simpler structure is provided, the power consumption is decreased, and the stability is improved.

In other embodiments, the flat-top band-pass filter structure, the Mach-Zehnder interferometry structure, and the micro ring resonation structure of the tunable filter may also be partially or completely arranged on the ring waveguide of the ring mirror. As shown in FIG. 13, the cascade structure of the flat-top band-pass filter structure 30, the Mach-Zehnder interferometry structure 40, and the micro ring resonation structure 50 is provided on the ring waveguide 92 of the ring mirror 90. The input port 911 of the ring mirror 90 is connected to the phase regulator 20 or the common port of the second optical splitting coupler 82 of the first monitoring structure. The gain light emitted by the reflective semiconductor optical amplifier 100 is coupled onto the silicon photonic integrated chip 200 through the first coupler 10, passes through the phase regulator 20, is incident from the input port 911 of the ring mirror 90, and is then divided into two paths, and the two paths of light enter the ring waveguide 92 from the two ends of the ring waveguide 92, respectively. The two paths of gain light with opposite transmission directions in the ring waveguide 92 are both filtered by the Mach-Zehnder interferometry structure 40, the micro ring resonation structure 50, and the flat-top band-pass filter structure 30 provided on the ring waveguide 92, are combined at the 2×2 coupler 91, and then are divided into two parts of light. A part of the light is returned through the input port 911 of the ring mirror 90 to continue to resonate in the external cavity, and the other part of the light is output through the output port 912 of the ring mirror. Herein, the micro ring resonation structure 50 is still cascaded with the flat-top band-pass filter structure 30 and the Mach-Zehnder interferometry structure 40 through its Input end 53 and the Drop end 54. Similarly, the cascade order of the three is not limited and may be reasonably arranged according to the actual design situation. Certainly, one or two of the Mach-Zehnder interferometry structure, the micro ring resonation structure, and the flat-top band-pass filter structure may also be arranged on the waveguide between the phase regulator and the input port of the ring mirror, and the other two or one may be arranged on the ring waveguide of the ring mirror.

Embodiment 3

As shown in FIG. 14, the difference between this embodiment and Embodiment 1 or 2 is that in this embodiment, the reflective semiconductor optical amplifier 100 is optically connected to the first coupler 10 on the silicon photonic integrated chip 200 through photonic wire bonding (PWB) 300. As shown in FIG. 15, during assembly, the semiconductor optical amplifier 100 and the silicon photonic integrated chip 200 are mounted on a substrate 400. Due to differences in chip thickness, waveguide position, etc., it is difficult to align the semiconductor optical amplifier 100 and the silicon photonic integrated chip 200. By using the photonic wire bonding 300 for optical connection, the requirements for the assembly position and alignment accuracy of the reflective semiconductor optical amplifier 100 and the silicon photonic integrated chip 200 are relatively low. The assembly difficulty of the reflective semiconductor optical amplifier 100 and the silicon photonic integrated chip 200 is reduced in this way, and the assembly efficiency of the tunable laser may be effectively improved.

In this embodiment, the first coupler 10 uses a grating coupler, and in other embodiments, the first coupler may also use a spot size converter.

Embodiment 4

As shown in FIG. 16, the difference between this embodiment and Embodiments 1 to 3 is that the semiconductor optical amplifier 100 of this embodiment adopts a semi-reflective type. That is, the first end surface 101 of the semiconductor optical amplifier 100 away from the silicon photonic integrated chip 200 is coated with a partial reflection film, which is used as a partial reflection cavity surface of the laser resonating cavity for outputting laser light. The second end surface 102 of the semiconductor optical amplifier 100 opposite to the first end surface 101 is coated with an anti-reflection film and is used for coupling with the silicon photonic integrated chip 100. The silicon photonic integrated chip 200 of this embodiment includes the first coupler 10, the phase regulator 20, and the tunable filter, and the tunable filter includes the band-pass filter structure 30, the Mach-Zehnder interferometry structure 40, and the micro ring resonation structure 50 which are cascaded. The Input end 53 and the Drop end 54 of the micro ring resonation structure 50 are connected onto the 1×2 coupler 60 to form the reflection end of the external cavity, and then form the external resonating cavity together with the first end surface 101 of the semiconductor optical amplifier 100 which is coated with a partially reflective film. There is no necessary to provide laser output port on the silicon photonic integrated chip, and the optical splitting coupler for outputting the laser light is omitted. The structure of the laser is further simplified, power consumption is reduced, and the design and layout of the silicon photonic integrated chip are improved in this way.

In this embodiment, the tunable filter is the same as the tunable filter in Embodiment 1, and a monitoring structure is also arranged between the tunable filter and the phase regulator. The first coupler uses a spot size converter, and the semiconductor optical amplifier is butt-coupled to the spot size converter. In other embodiments, the tunable filter may also use the same structure as the tunable filter in Embodiment 2, and the first coupler may also use a grating coupler. The semiconductor optical amplifier and the first coupler may also be optically connected through photonic bonding wires.

Embodiment 5

As shown in FIG. 17, this embodiment provides an optical module including the tunable laser according to any one of Embodiments 1 to 4. An optical modulator 500 is further provided on the silicon photonic integrated chip 200, and the laser light output by the tunable laser is transmitted onto the optical modulator 500 and is modulated by the optical modulator 500, and a modulated optical signal is then output.

To be specific, if the tunable laser described in any one of Embodiments 1 to 3 is used, the laser output port is also arranged on the silicon photonic integrated chip 200, and may be directly connected to the optical modulator 500 through the waveguide on the silicon photonic integrated chip 200. If the tunable laser of Embodiment 4 is used and the laser output end is arranged on the end surface of the semiconductor optical amplifier, the laser light output from the tunable laser may be transmitted to the optical modulator through a photonic wire bonding or an optical fiber.

The series of detailed descriptions listed above are only specific descriptions of feasible implementations of the disclosure, and they are not intended to limit the protection scope of the disclosure. All equivalent embodiments or modifications made without departing from the technical spirit of the disclosure shall be included within the protection scope of the disclosure.

What is claimed is:

1. A silicon-based tunable filter, comprising a flat-top band-pass filter structure, a Mach-Zehnder interferometry structure, and one micro ring resonation structure that are formed on a silicon substrate, wherein the Mach-Zehnder interferometry structure has asymmetric tunable phase shift arms, the micro ring resonation structure comprises one tunable ring waveguide and two straight waveguides, the two straight waveguides are respectively coupled to the tunable ring waveguide to act as an Input end and a Drop end of the micro ring resonation structure, and the micro ring resonation structure is cascaded with the flat-top band-pass filter structure and the Mach-Zehnder interferometry structure through the Input end and/or the Drop end, the interference effect of the Mach-Zehnder interferometry structure and the resonance effect of the micro ring resonation structure are superimposed on an optical signal, and the filtering effect of the flat-top band-pass filter structure is also act on the optical signal, which forms a tunable narrowband filtered optical signal to output, wherein a ring mirror is also provided on the silicon substrate, the ring mirror comprises a 2×2 coupler and a ring waveguide, the ring waveguide is respectively connected to two ports on one side of the 2×2 coupler, and two ports on the other side of the 2×2 coupler are respectively an input port and an output port, the flat-top band-pass filter structure, the Mach-Zehnder interferometry structure, and the micro ring resonation structure are respectively cascaded on the ring waveguide and/or on the input port of the 2×2 coupler, and wherein the flat-top band-pass filter structure comprises a mode multiplexer and a multi-mode Bragg grating, the mode multiplexer comprises a straight-through waveguide and a cross-couple waveguide, the straight-through waveguide has a straight-through port, the cross-couple waveguide has a cross-over port, the other end of the straight-through waveguide opposite to the straight-through port is connected to the multi-mode Bragg grating, an incident light input from the straight-through port is incident on the multi-mode Bragg grating through the straight-through waveguide, and a reflected light reflecting off the multi-mode Bragg grating is output from the cross-over port after a mode conversion from the straight-through waveguide to the cross-couple waveguide.

2. The silicon-based tunable filter according to claim 1, wherein a 1×2 coupler is also provided on the silicon substrate, the 1×2 coupler comprises one main waveguide and two branch waveguides, the two branch waveguides are respectively connected to the Input end and the Drop end of the micro ring resonation structure, and the Mach-Zehnder interferometry structure comprises a first 3 dB coupler, two asymmetric tunable phase shift arms, and a second 3 dB coupler, the first 3 dB coupler of the Mach-Zehnder interferometry structure is connected to the cross-over port of the flat-top band-pass filter structure, and the second 3 dB coupler is connected to the main waveguide of the 1×2 coupler, or the straight-through port of the flat-top band-pass filter structure is connected to the second 3 dB coupler of the Mach-Zehnder interferometry structure, and the cross-over port is connected to the main waveguide of the 1×2 coupler, or the flat-top band-pass filter structure and the Mach-Zehnder interferometry structure are respectively arranged between the two branch waveguides of the 1×2 coupler and the Input end and the Drop end of the micro ring resonation structure, or one of the flat-top band-pass filter structure and the Mach-Zehnder interferometry structure is arranged between one branch waveguide of the 1×2 coupler and the Input end or the Drop end of the micro ring resonation structure, and the other one is connected to the main waveguide of the 1×2 coupler.

3. The silicon-based tunable filter according to claim 1, wherein a free spectral range of the Mach-Zehnder interferometry structure is greater than or equal to 2 times a free spectral range of the micro ring resonation structure and less than or equal to 4 times the free spectral range of the micro ring resonation structure.

4. A tunable laser, comprising a semiconductor optical amplifier and a silicon photonic integrated chip, wherein a first coupler, a phase regulator, and a tunable filter are provided on the silicon photonic integrated chip, and the tunable filter comprises a flat-top band-pass filter structure, a Mach-Zehnder interferometry structure, and one micro ring resonation structure which are cascaded, the Mach-Zehnder interferometry structure has asymmetric tunable phase shift arms, the micro ring resonation structure comprises one tunable ring waveguide and two straight waveguides, the two straight waveguides are respectively coupled to the tunable ring waveguide to act as an Input end and a Drop end of the micro ring resonation structure, and the micro ring resonation structure is cascaded with the flat-top band-pass filter structure and the Mach-Zehnder interferometry structure through the Input end and/or the Drop end, a gain light emitted by the semiconductor optical amplifier is coupled to the silicon photonic integrated chip through the first coupler, and then the interference effect of the Mach-Zehnder interferometry structure and the resonance effect of the micro ring resonation structure are superimposed on the gain light, and the filtering effect of the flat-top band-pass filter structure is also act on the gain light, which forms a tunable target wavelength light to output, the phase regulator is configured to regulate a phase of the gain light, wherein the semiconductor optical amplifier is a reflective semiconductor optical amplifier, the tunable filter also comprises a ring mirror, the ring mirror comprises a 2×2 coupler and a ring waveguide, the ring waveguide is respectively connected to two ports on one side of the 2×2 coupler, and two ports on the other side of the 2×2 coupler are respectively an input port and an output port, one, two, or three of the flat-top band-pass filter structure, the Mach-Zehnder interferometry structure, and the micro ring resonation structure are cascaded on the ring waveguide and/or on the input port of the 2×2 coupler, and the output port of the 2×2 coupler is a laser output port for outputting a laser light.

5. The tunable laser according to claim 4, wherein the tunable filter also comprises a 1×2 coupler, the 1×2 coupler comprises one main waveguide and two branch waveguides, and the two branch waveguides are respectively connected to the Input end and the Drop end of the micro ring resonation structure, the flat-top band-pass filter structure and the Mach-Zehnder interferometry structure are cascaded with the main waveguide of the 1×2 coupler, or the flat-top band-pass filter structure and the Mach-Zehnder interferometry structure are respectively arranged between the two branch waveguides of the 1×2 coupler and the Input end and the Drop end of the micro ring resonation structure, or one of the flat-top band-pass filter structure and the Mach-Zehnder interferometry structure is arranged between one branch waveguide of the 1×2 coupler and the Input end or the Drop end of the micro ring resonation structure, and the other one is connected to the main waveguide of the 1×2 coupler.

6. The tunable laser according to claim 5, wherein the semiconductor optical amplifier is a reflective semiconductor optical amplifier, a first optical splitting coupler is also provided on the silicon photonic integrated chip, the first optical splitting coupler comprises one common port and two branch ports, the first optical splitting coupler is connected to an optical path between the first coupler and the tunable filter through the common port and one branch port of the two branch ports, and the other branch port of the two branch ports is a laser output port for outputting a laser light.

7. The tunable laser according to claim 6, wherein a second monitor photodiode and a third optical splitting coupler are also provided on the silicon photonic integrated chip, the third optical splitting coupler comprises one common port and two branch ports, the common port is connected to the laser output port, one branch port of the two branch ports is connected to the second monitor photodiode, and the other branch port outputs the laser light.

8. The tunable laser according to claim 5, wherein the semiconductor optical amplifier comprises a first end surface and a second end surface opposite to each other, the second end surface is coupled to the silicon photonic integrated chip, and the first end surface is coated with a partially reflective film to act as a cavity surface of a laser resonating cavity.

9. The tunable laser according to claim 4, wherein the flat-top band-pass filter structure comprises a mode multiplexer and a multi-mode Bragg grating, the mode multiplexer comprises a straight-through waveguide and a cross-couple waveguide, the straight-through waveguide has a straight-through port, the cross-couple waveguide has a cross-over port, the other end of the straight-through waveguide opposite to the straight-through port is connected to the multi-mode Bragg grating, an incident light input from the straight-through port is incident on the multi-mode Bragg grating through the straight-through waveguide, and a reflected light reflecting off the multi-mode Bragg grating is output from the cross-over port after a mode conversion from the straight-through waveguide to the cross-couple waveguide.

10. The tunable laser according to claim 4, wherein a first monitor photodiode and a second optical splitting coupler are also provided on the silicon photonic integrated chip, the second optical splitting coupler comprises one common port and two branch ports, the common port is connected to the tunable filter, one branch port of the two branch ports is connected to the phase regulator, and the other branch port is connected to the first monitor photodiode.

11. The tunable laser according to claim 4, wherein a free spectral range of the Mach-Zehnder interferometry structure is greater than or equal to 2 times a free spectral range of the micro ring resonation structure and less than or equal to 4 times the free spectral range of the micro ring resonation structure, and
a bandwidth of the band-pass filter is greater than a tuning range of the tunable laser and is less than a difference between twice the free spectral range of the Mach-Zehnder interferometry structure and the tuning range of the tunable laser.

12. The tunable laser according to claim 4, wherein the first coupler is a spot size converter or a grating coupler.

13. The tunable laser according to claim 4, wherein the semiconductor optical amplifier is butt-coupled to the first coupler, or the semiconductor optical amplifier and the first coupler are optically connected by photonic wire bonding.

14. An optical module, comprising the tunable laser according to claim 4.

15. The optical module according to claim 14, further comprising: an optical modulator, disposed on the silicon photonic integrated chip, wherein the laser light output from the tunable laser is transmitted to the optical modulator and is modulated by the optical modulator, and then a modulated optical signal is output.

16. A tunable laser, comprising a semiconductor optical amplifier and a silicon photonic integrated chip, the semiconductor optical amplifier is configured to provide a laser gain, the semiconductor optical amplifier has a first end surface and a second end surface opposite to each other, the second end surface is configured to be coupled to the silicon photonic integrated chip, and the first end surface acts as a cavity surface of a laser resonating cavity, wherein the silicon photonic integrated chip comprises:
a first coupler, configured to couple the semiconductor optical amplifier and the silicon photonic integrated chip;
a phase regulator, configured to regulate the phase of a laser light; and
a tunable filter, configured to filter a resonant light in the laser resonating cavity to obtain a single-peak narrow-band laser output, wherein another cavity surface of the laser resonating cavity is disposed on the tunable filter, and the first coupler and the phase regulator are located in the laser resonating cavity,
the tunable filter comprises a flat-top band-pass filter structure, a Mach-Zehnder interferometry structure, and one micro ring resonation structure which are cascaded, the Mach-Zehnder interferometry structure has asymmetric tunable phase shift arms, the micro ring resonation structure comprises one tunable ring waveguide and two straight waveguides, the two straight waveguides are respectively coupled to the tunable ring waveguide to act as an Input end and a Drop end of the micro ring resonation structure, and the micro ring resonation structure is cascaded with the flat-top band-pass filter structure and the Mach-Zehnder interferometry structure through the Input end and/or the Drop end,
wherein
the semiconductor optical amplifier is a reflective semiconductor optical amplifier,
the tunable filter also comprises a ring mirror, the ring mirror comprises a 2×2 coupler and a ring waveguide, the ring waveguide is respectively connected to two ports on one side of the 2×2 coupler, and two ports on the other side of the 2×2 coupler are respectively an input port and an output port, one, two, or three of the flat-top band-pass filter structure, the Mach-Zehnder interferometry structure, and the micro ring resonation structure are cascaded on the ring waveguide and/or on the input port of the 2×2 coupler,
the ring mirror acts as the end surface of the laser resonating cavity which is disposed on the tunable filter, and the output port of the 2×2 coupler is a laser output port for outputting the laser light.

17. The tunable laser according to claim 16, wherein
the tunable filter also comprises a 1×2 coupler, the 1×2 coupler comprises one main waveguide and two branch waveguides, the two branch waveguides are respectively connected to the Input end and the Drop end of the micro ring resonation structure, and the micro ring resonation structure acts as the end surface of the laser resonating cavity which is disposed on the tunable filter, the first end surface of the semiconductor optical amplifier is coated with a partially reflective film for outputting the laser light, or the semiconductor optical amplifier is a reflective semiconductor optical amplifier, a first optical splitting coupler is also provided on the silicon photonic integrated chip, the first optical splitting coupler comprises one common port and two branch ports, the first optical splitting coupler is connected to an optical path between the first coupler and the tunable filter through the common port and one branch port of the two branch ports, and the other branch port of the two branch ports is a laser output port for outputting the laser light.

18. The tunable laser according to claim 16, wherein the flat-top band-pass filter structure comprises a mode multiplexer and a multi-mode Bragg grating, the mode multiplexer comprises a straight-through waveguide and a cross-couple waveguide, the straight-through waveguide has a straight-through port, the cross-couple waveguide has a cross-over port, the other end of the straight-through waveguide opposite to the straight-through port is connected to the multi-mode Bragg grating, an incident light input from the straight-through port is incident on the multi-mode Bragg grating through the straight-through waveguide, and a reflected light reflecting off the multi-mode Bragg grating is output from the cross-over port after a mode conversion from the straight-through waveguide to the cross-couple waveguide.

\* \* \* \* \*